(12) United States Patent
Hammer (10) Patent No.: US 9,311,514 B2
(45) Date of Patent: Apr. 12, 2016

(54) IMAGING BARCODE SCANNER WITH MULTIPLE INDEPENDENT FIELDS OF VIEW

(71) Applicant: NCR Corporation, Duluth, GA (US)

(72) Inventor: Steven J. Hammer, Lilburn, GA (US)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 14/227,813

(22) Filed: Mar. 27, 2014

(65) Prior Publication Data

US 2015/0278566 A1  Oct. 1, 2015

(51) Int. Cl.
*G06K 7/10* (2006.01)
*G06K 7/12* (2006.01)

(52) U.S. Cl.
CPC ........ *G06K 7/10574* (2013.01); *G06K 7/10702* (2013.01); *G06K 7/12* (2013.01)

(58) Field of Classification Search
USPC ........................................ 235/462.01–462.49
See application file for complete search history.

(56) References Cited

U.S. PATENT DOCUMENTS

2010/0270376 A1* 10/2010 McQueen ................ 235/462.11

* cited by examiner

*Primary Examiner* — Jamara Franklin
(74) *Attorney, Agent, or Firm* — Paul W. Martin; Schwegman, Lundberg & Woessner (57) ABSTRACT

A barcode scanner which uses different wavelengths of light to produce different fields of view. An example barcode scanner includes a plurality of light devices each having a different wavelength of light and each associated with a different field of view for illuminating an item with a barcode, a plurality of waveband mirrors each reflecting one of the different wavelengths of light from the light devices and transmitting other wavelengths of light, an imager for receiving the different wavelengths of light reflected from the waveband mirrors and for producing corresponding images, and a controller configured to sequentially activate the light devices and the imager and to decode the barcode in an at least one of the images received from the imager.

18 Claims, 10 Drawing Sheets

IMAGING BARCODE SCANNER WITH MULTIPLE INDEPENDENT FIELDS OF VIEW

BACKGROUND

This present invention relates to barcode scanners and more specifically to an imaging barcode scanner with multiple independent fields of view.

Barcode scanners are well known for their usefulness in retail checkout and inventory control. An imaging barcode scanner includes one or more digital image sensors or imagers to capture images of an item, including a barcode on the item.

Some barcode scanners used in checkout environments are capable of reading a barcode on an item from multiple directions. These multi-aperture barcode scanners may include a horizontal aperture that is substantially flush with the checkout counter and a vertical aperture in a "tower" portion that extends upwards from the checkout counter.

Current multi-aperture imaging barcode scanners use multiple imagers and/or mirrors that split the camera's field of view into several smaller fields of view (FOV). The splitting of the FOV reduces scanning performance by not only reducing the size of the scan zone, but also having to stitch together pieces of barcodes which no longer fit within a full sized FOV.

Therefore, it would be desirable to provide an imaging barcode scanner with enhanced performance that does not split the imager's field of view.

SUMMARY

In accordance with the teachings of the present invention, an imaging barcode scanner with multiple independent fields of view is provided.

An example barcode scanner includes a plurality of light devices each having a different wavelength of light and each associated with a different field of view for illuminating an item with a barcode, a plurality of waveband mirrors each reflecting one of the different wavelengths of light from the light devices and transmitting other wavelengths of light, an imager for receiving the different wavelengths of light reflected from the waveband mirrors and for producing corresponding images, and a controller configured to sequentially activate the light devices and the imager and to decode the barcode in an at least one of the images received from the imager.

An example scanning method includes sequentially activating a plurality of light devices each having a different wavelength of light and each associated with a different field of view to illuminate an item with a barcode, reflecting at least one of the different wavelengths of light towards an imager by a waveband mirror, producing an image from the one wavelength of light by the imager; and decoding the barcode in the image.

BRIEF DESCRIPTION OF THE DRAWINGS

The present invention may take form in various components and arrangement of components and in various methods. The drawings are only for purposes of illustrating example embodiments and alternatives and are not to be construed as limiting the invention.

DETAILED DESCRIPTION

Figure 1:
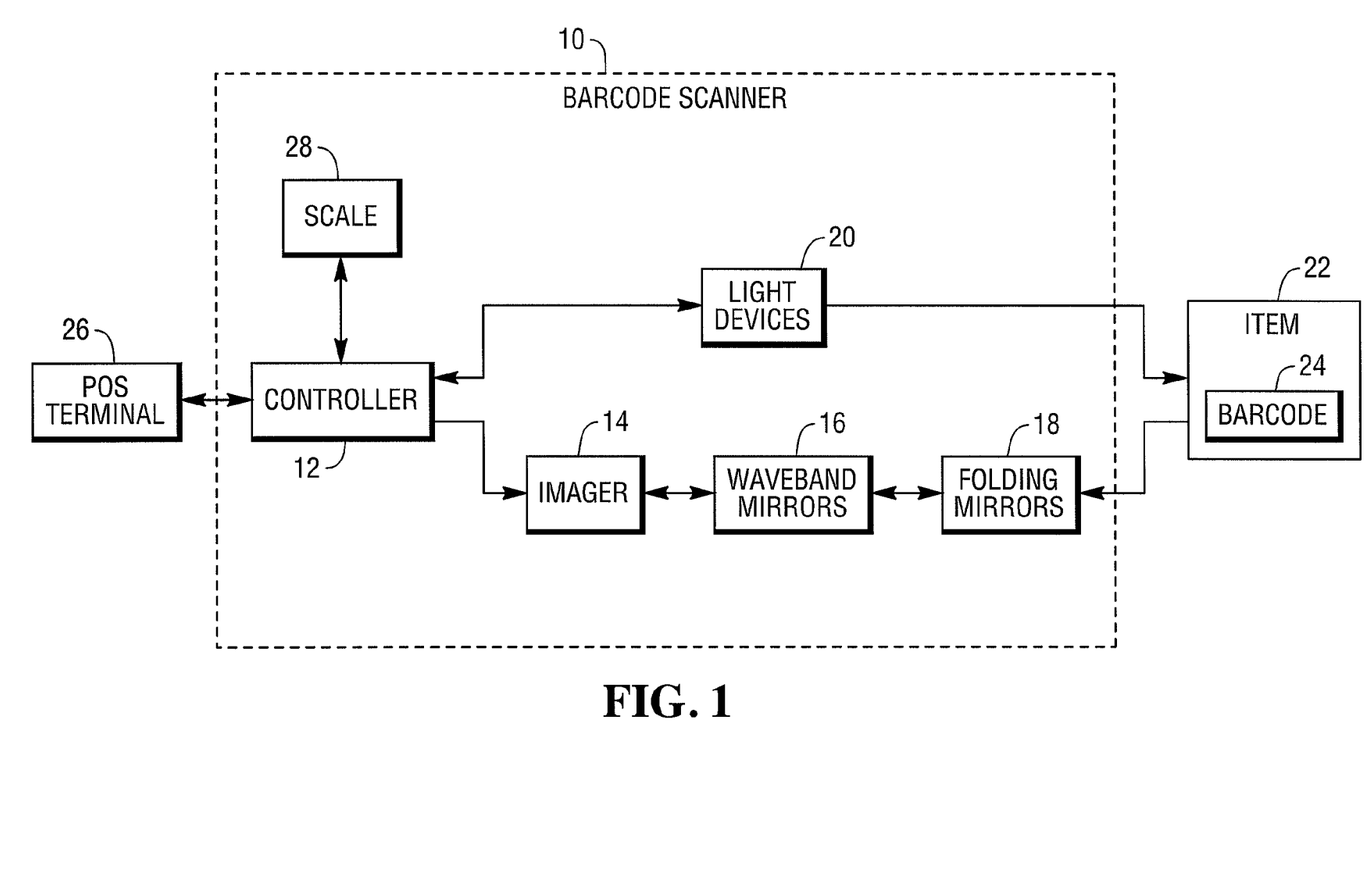
FIG. 1 is a block diagram of an example barcode scanner.

Referring now to FIG. 1, an example barcode scanner 10 includes controller 12, imager 14, waveband mirrors 16, folding mirrors 18, and light devices 20.

Controller 12 controls operation of barcode scanner 10, including controlling illumination of items 22 by light devices 20, activation of imager 14 in synchronism with illumination, and processing of images received from imager 14. Processing of images may include identifying barcodes 24 in the images and decoding the barcodes 24. Controller 12 sends decoded barcode information, including item identification information, to point of sale (POS) terminal, which adds obtains price information for items 22 and adds items 22 to a transaction.

Imager 14 captures images of items 22 during scanning. Imager 14 may include a sensor with a Charge Coupled Device (CCD) or Complementary Metal-Oxide-Semiconductor (CMOS) with pixel elements that convert light to electrical signals that contain color information.

Waveband mirrors 16 each reflect a different waveband of illumination and transmit other wavelengths. An example of such a mirror would be either a "long" or "short" pass mirror from Edmund Scientific, CVI, Melles Griot, or Rolyn Optics. Custom waveband mirrors may come from JDSU, Barr Associates, or Esco Products.

Folding mirrors 18 direct light reflected from items 22 to waveband mirrors 16.

Light devices 20 each emit light at different wavelengths (or different wavelength bands). Each light device 20 is associated with a different field of view (FOV). Controller 12 synchronizes activation of light devices 20 with the frame rate of imager 14 and pulses light devices 20 sequentially in a repeatable order so that imager 14 only sees light from one light device 20 and one corresponding FOV at any instant in time and produces one or more corresponding images. Light devices 20 may include narrow band light emitting diodes (LEDs).

Barcode scanner 10 may further include scale 28 for measuring weights of items 22. For example, when item 22 is a produce item, scale 28 provides weight information to controller 12, which passes the weight information to POS terminal 26 to obtain pricing information and add the produce item to the transaction.

Figure 2:
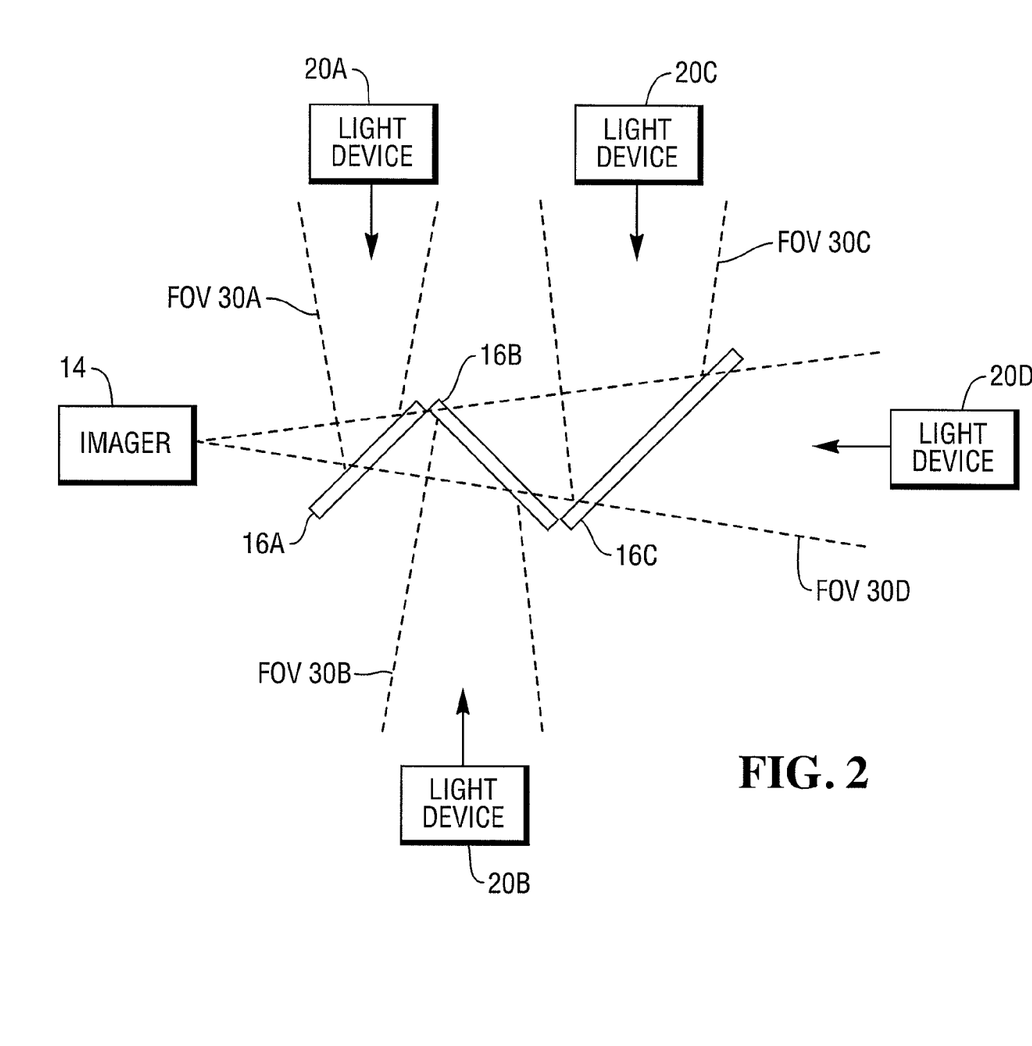
FIG. 2 illustrates an example configuration of the barcode scanner that produces multiple different fields of view.

With reference to FIG. 2, and example configuration is illustrated which produces four different and independent FOVs 30A-30D and uses a single imager 14. Other configurations with other numbers of FOVs 30 and imagers 14 are also envisioned.

Waveband mirror 16A is oriented at a first angle with respect to imager 14 to produce a first FOV 30A by reflecting from a first direction light from light device 20A towards imager 14. Waveband mirror 16A is transparent to other wavelengths of light, including light from light devices 20B-20D.

Waveband mirror 16B is oriented adjacent waveband mirror 16A at a second angle with respect to imager 14 to produce a second FOV 30B by reflecting from a second direction light from light device 20B towards imager 14. Waveband mirror 16B is transparent to other wavelengths of light, including light from light devices 20C-20D.

Waveband mirror 16C is oriented adjacent waveband mirror 16B at a third angle with respect to imager 14 to produce a third FOV 30C by reflecting from a third direction light from light device 20C towards imager 14. Waveband mirror 16C is transparent to other wavelengths of light, including light from light devices 20D.

A fourth FOV 30D results when reflecting from a fourth direction light from light device 20D towards imager 14. Waveband mirrors 16A-16C are transparent to light from light device 20D.

Light devices 20A-20D are positioned to sequentially illuminate all sides of item 22 during scanning. In one example embodiment, light devices 20A-20D are mounted adjacent to imager 14 on a common printed circuit board. In this configuration, light from light device 20A reflects from waveband mirror 16A, light from light device 20B passes through waveband mirror 16A and reflects from waveband mirror 16A, light from light device 20C passes through waveband mirrors 16A-16B and reflects from waveband mirror 16C, and light from light device 20D passes through waveband mirrors 16A-16C without reflection.

In another configuration, light devices 20A-20D are mounted separately from imager 14, but internal to the scanner housing.

In another configuration, light devices 20A-20D are mounted externally on the housing of barcode scanner 10. Combinations of all three configurations are also envisioned.

Figure 3:
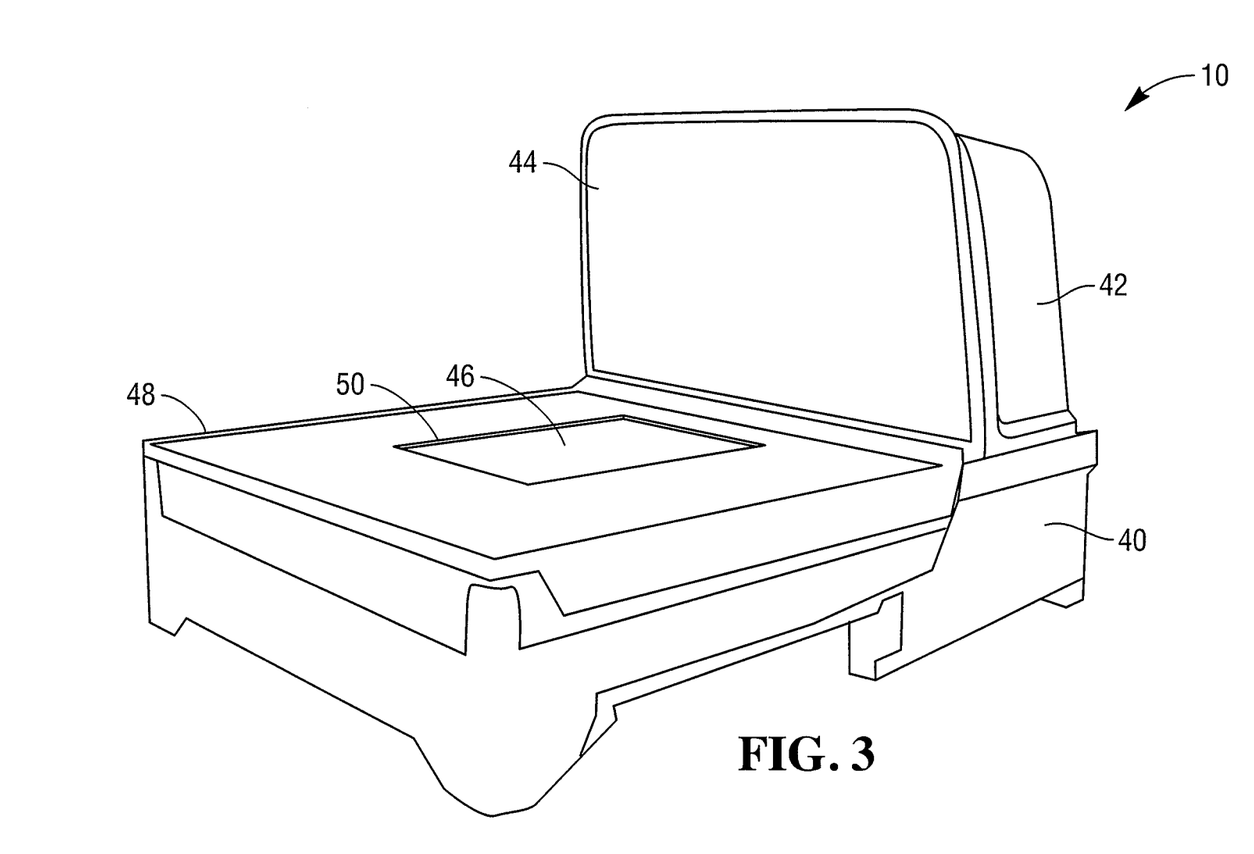
FIG. 3 is a perspective view of one example barcode scanner.

With reference to FIG. 3, example barcode scanner 10 includes a lower portion 40 with a substantially horizontal window 46 and an upper or "tower" portion 42 with a substantially vertical aperture 44. When equipped with scale 28, example barcode scanner 10 includes scale weigh plate 48, which has its own window 50.

Figure 4:
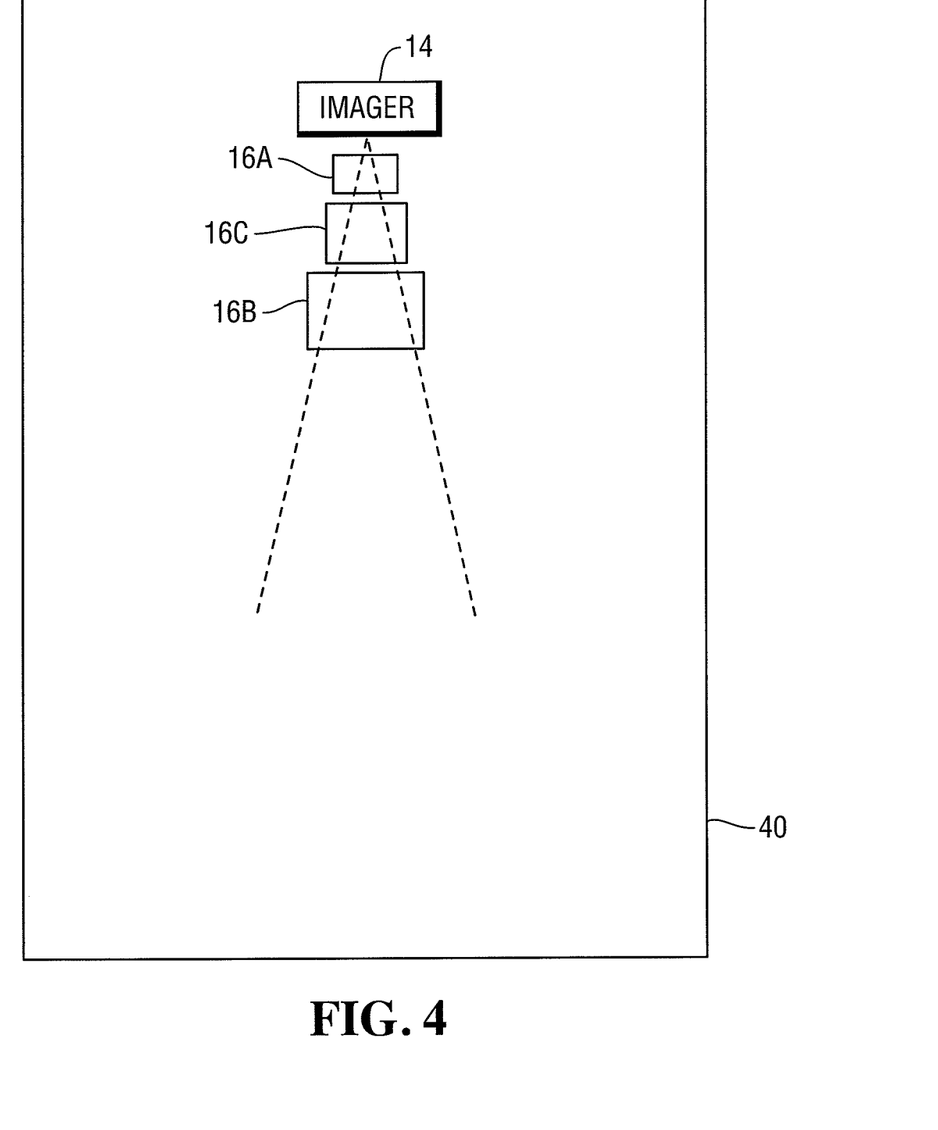
FIG. 4 further illustrates an example positioning of the example configuration within the example barcode scanner of FIG. 3.

Referring now to FIG. 4, imager 14 and waveband mirrors 16A-C are located along a longitudinal line within lower portion 40. Waveband mirrors 16A-16C may be the same size or be progressively larger in size with distance away from imager 14

With the addition of folding mirrors 18, a barcode scanner 10 that has the example configuration can scan a barcode on item 22 from any direction ("six-sided" scanning when item 22 has a box-like shape), regardless of the orientation of item 22 with respect to barcode scanner 10. A single imager 14 may be used, since this configuration does not split any FOVs 30, though other configurations are envisioned which use more than one imager 14. Independent FOVs 30A-30D combine to form the scan volume of barcode scanner 10, using only three waveband mirrors 16A-C to produce six-sided scanning. Other configurations and numbers of waveband mirrors are also envisioned.

Figure 5:
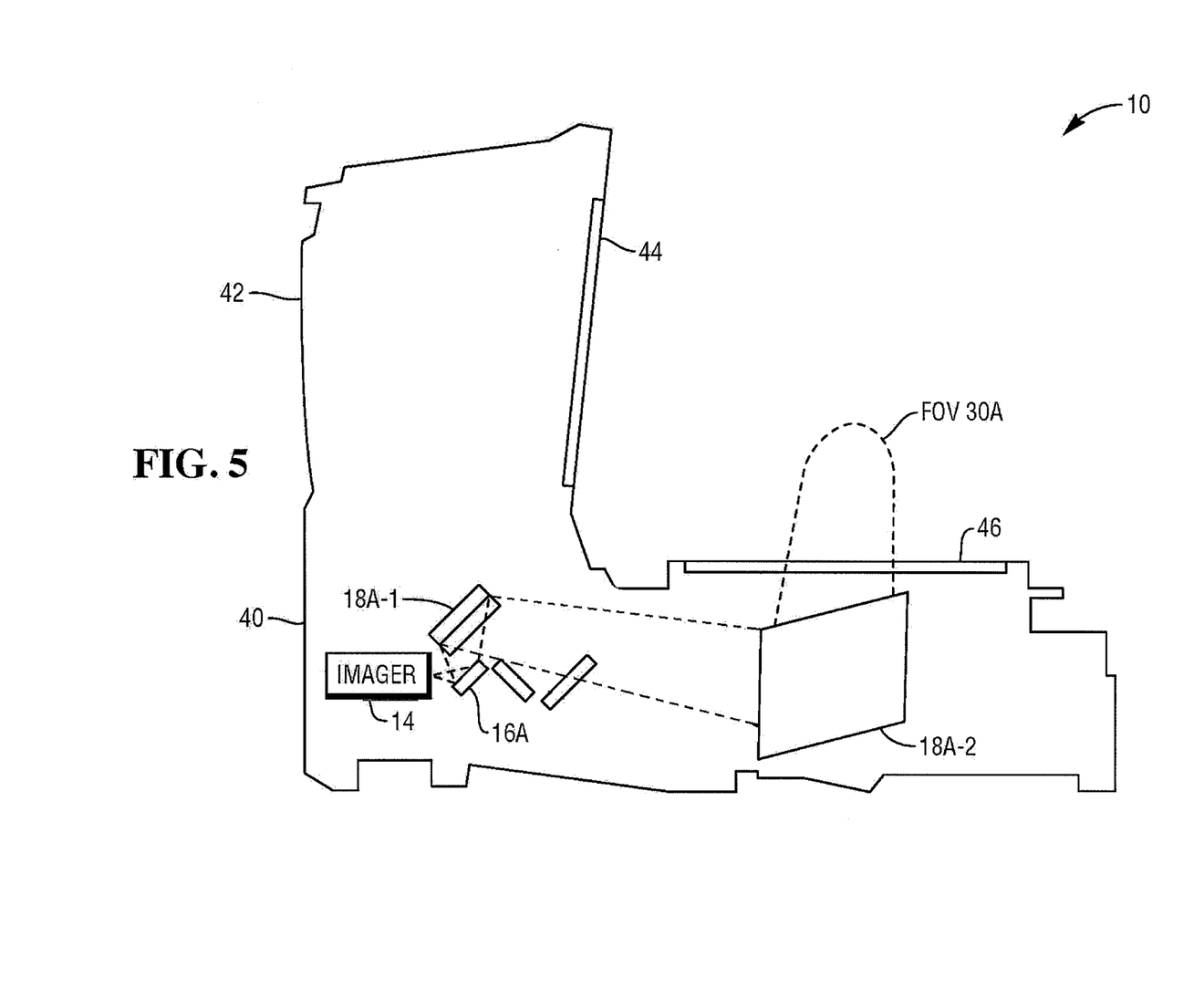
FIG. 5 illustrates an example mirror configuration associated with a first field of view of the example barcode scanner.

Referring now to FIG. 5, folding mirrors 18A-1 and 18A-2 are located in lower portion 40 and direct light from light device 20A that is reflected from a leading side of item 22 through aperture 46. Folding mirror 18A-2 is located on one side of lower portion 40 and tilted to redirect the light from the leading edge of item 22 to folding mirror 18A-1. Folding mirror 18A-1 is tilted so as to direct the light from folding mirror 18A-2 to waveband mirror 16A.

Figure 6:
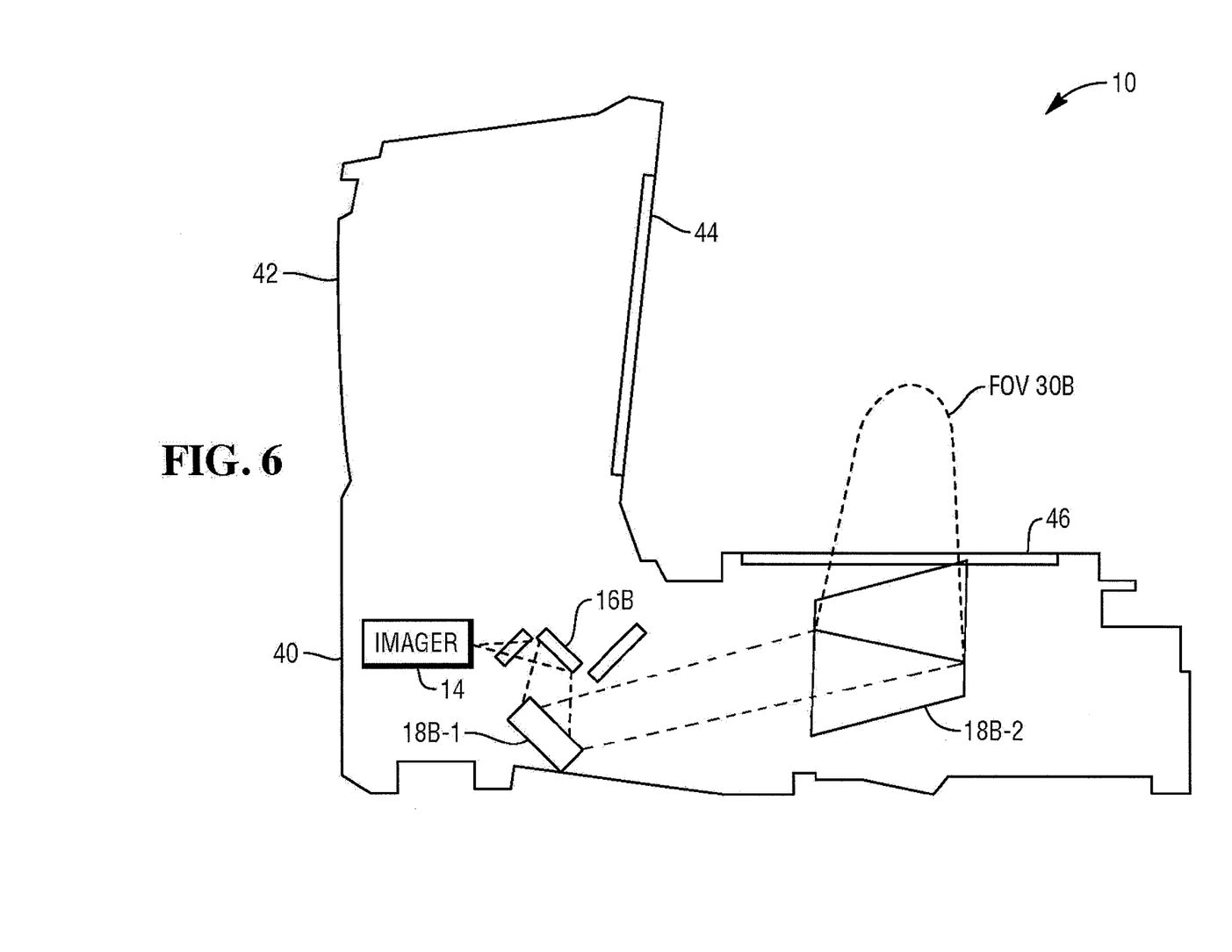
FIG. 6 illustrates an example mirror configuration associated with a second field of view of the example barcode scanner.

Referring now to FIG. 6, folding mirrors 18B-1 and 18B-2 are located in lower portion 40 and direct light from light device 20B that is reflected from a trailing side of item 22 through aperture 46. Folding mirror 18B-2 is located on a side of lower portion 40 opposite folding mirror 18A-2 and tilted to redirect the light from the trailing edge of item 22 to folding mirror 18B-1. Folding mirror 18B-1 is tilted so as to direct the light from folding mirror 18B-2 to waveband mirror 16B.

Figure 7:
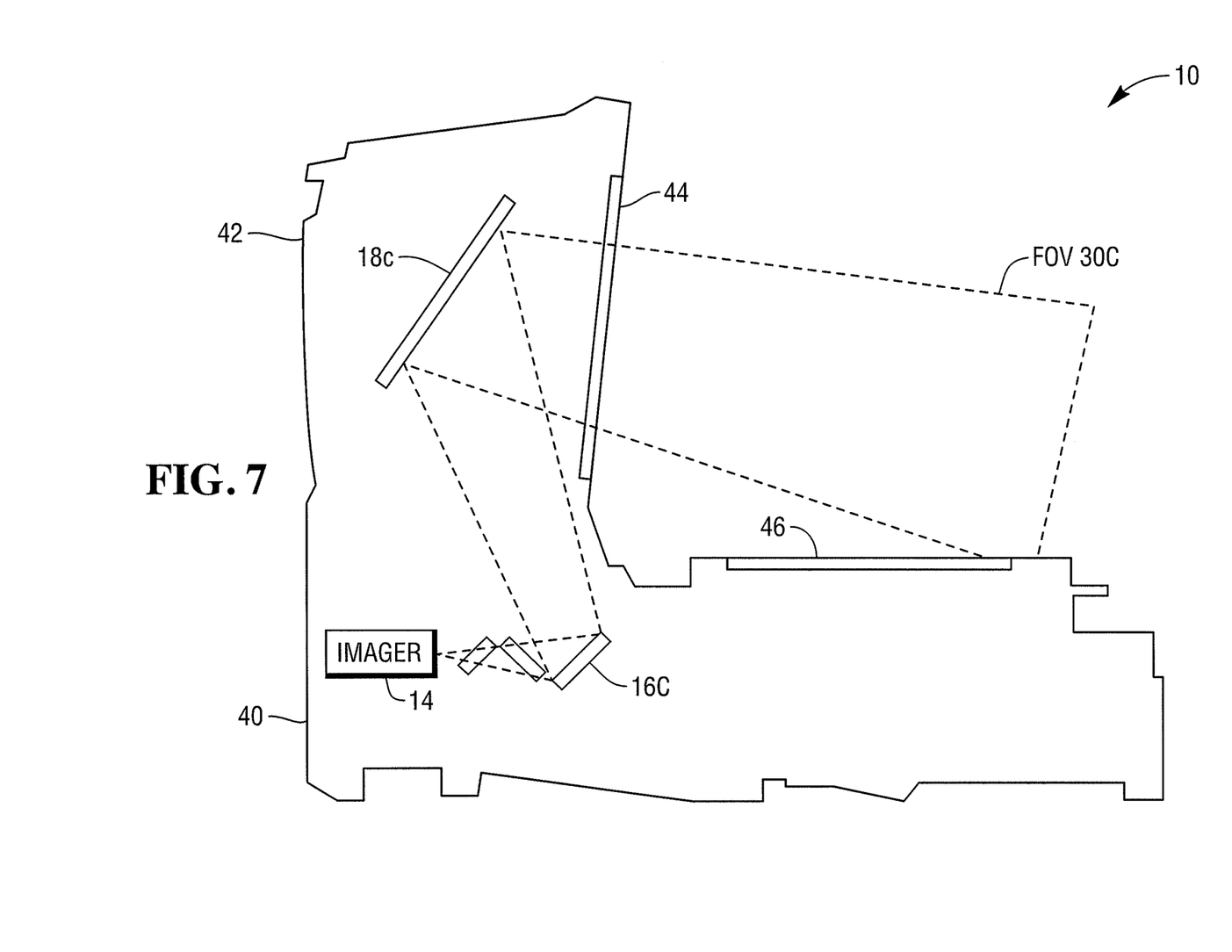
FIG. 7 illustrates an example mirror configuration associated with a third field of view of the example barcode scanner.

Referring now to FIG. 7, folding mirror 18C is located in upper portion 42 and directs light from light device 20C that is reflected from a top side of item 22 and a tower-facing side of item 22 through aperture 44. Folding mirror 18C is tilted to redirect the light from the top side of item 22 to waveband mirror 16C.

Figure 8:
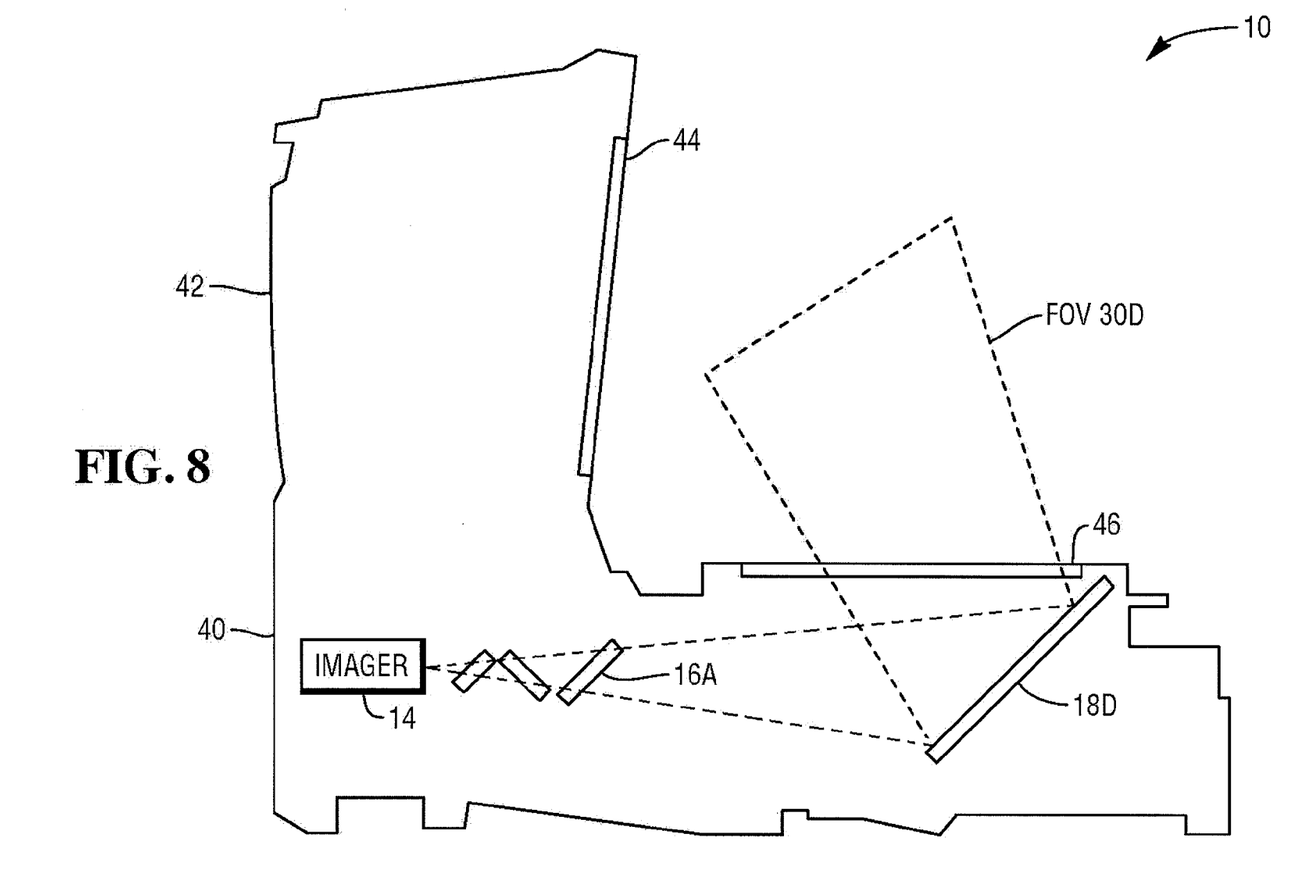
FIG. 8 illustrates an example mirror configuration associated with a fourth field of view of the example barcode scanner.

Referring now to FIG. 8, folding mirror 18D is located in lower portion 40 and directs light from light device 20D that is reflected from a bottom side of item 22 and from an operator-facing side of item 22 through aperture 46. Folding mirror 18D is tilted to redirect the light from the bottom and operator-facing sides of item 22 through waveband mirrors 16A-16C to imager 14.

Figure 9:
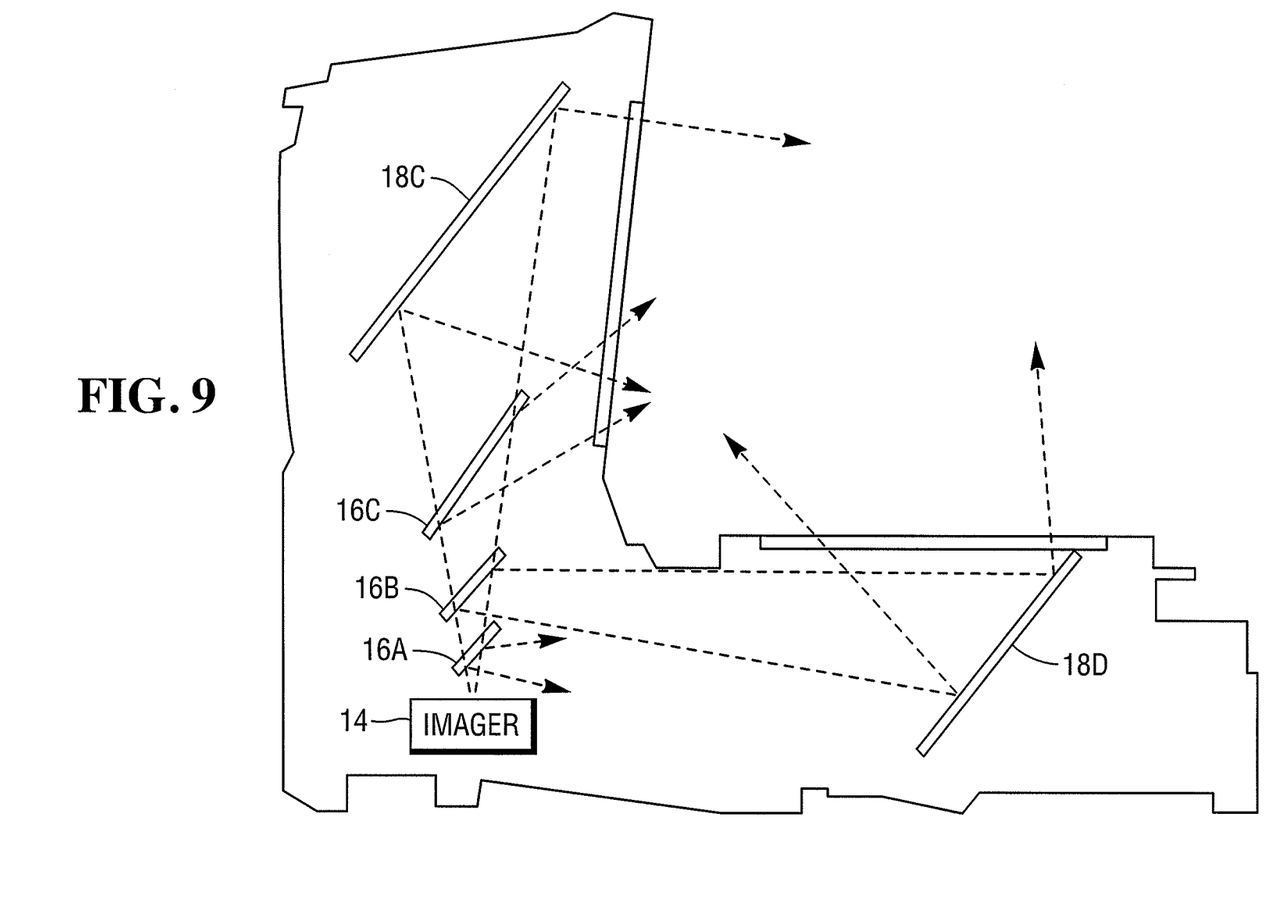
FIG. 9 illustrates another example configuration of the barcode scanner that produces multiple different fields of view.
Figure 10:
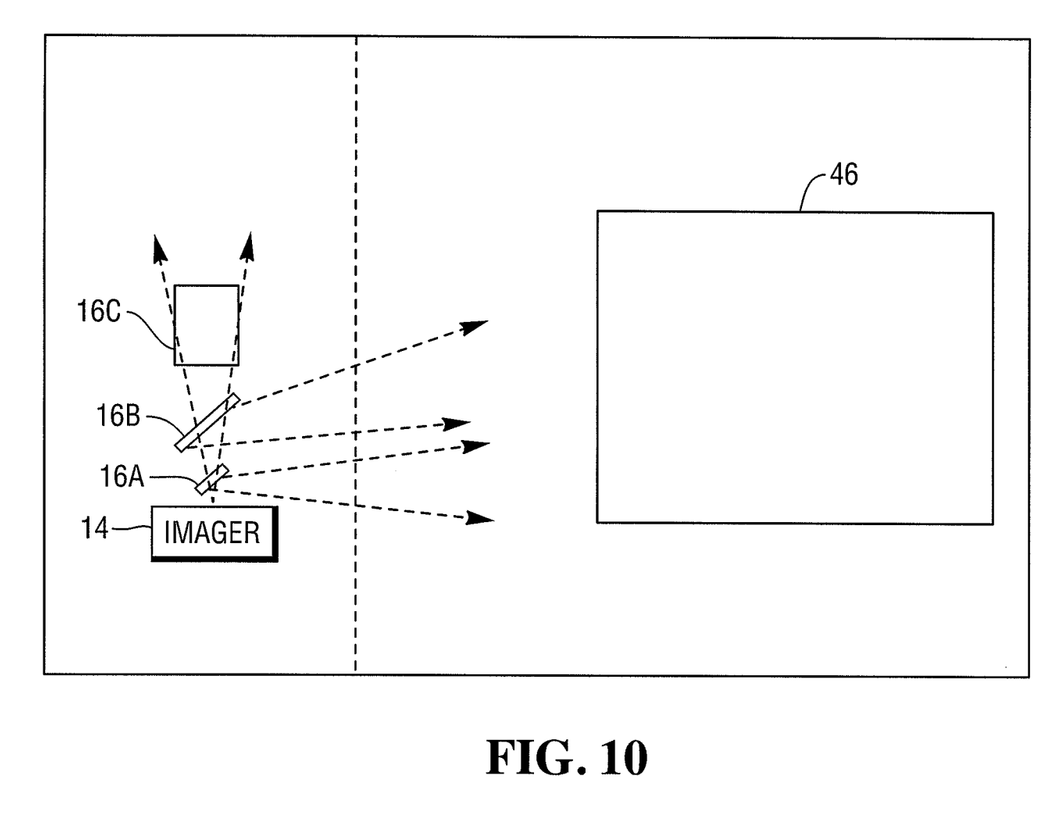
FIG. 10 illustrates another example configuration of the barcode scanner that produces multiple different fields of view.

FIGS. 9 and 10 contain alternate embodiments illustrating other ways to position and orient waveband mirrors 16A-16C within the scanner housing. FIG. 9 illustrates waveband mirrors 16A-16C oriented vertically within the tower portion 42. FIG. 10 illustrates waveband mirrors 16A-16C oriented horizontally, but substantially perpendicular to the orientation in FIGS. 5-8.

Advantageously, the example configurations result in improved performance and the captured spectral content may provide additional information for product & produce recognition.

Although the present invention has been described with particular reference to certain preferred embodiments thereof, variations and modifications of the present invention can be effected within the spirit and scope of the following claims.

What is claimed is:

1. An image capture device comprising:
   a plurality of waveband mirrors each reflecting a different wavelength of light associated with a different unique field of view and each transmitting wavelengths of light other than the different wavelength of light; and
   an imager for receiving the different wavelengths of light reflected from the waveband mirrors, wherein the imager receives each wavelength for each field of view individually at a particular instant in time from a particular light device that is pulsing at a given frame rate recognized by the imager.

2. The image capture device of claim 1, wherein the imager is also for receiving another wavelength of light associated with another field of view.

3. The image capture device of claim 2, wherein the other wavelength of light passes through at least one of the waveband mirrors.

4. The image capture device of claim 2, wherein the waveband mirrors are oriented in line such that the other wavelength of light passes through all of the waveband mirrors.

5. A barcode scanner comprising:
a plurality of light devices each having a different wavelength of light and each associated with a different field of view for illuminating an item with a barcode;
a plurality of waveband mirrors each reflecting one of the different wavelengths of light from the light devices and each transmitting wavelengths of light other than the different wavelength of light;
an imager for receiving the different wavelengths of light reflected from the waveband mirrors and for producing corresponding images; and
a controller configured to sequentially activate the light devices and the imager and to decode the barcode in an at least one of the images received from the imager, and wherein the controller is further configured to synchronize activation of the light devices with a frame rate of the imager and the controller configured to pulse the light devices sequentially in a repeatable order for ensuring that the imager only receives light from a single one of the light devices and a corresponding field of view for the item at any given instant in time.

6. The barcode scanner of claim 5, wherein the imager is also for receiving one of the different wavelengths of light that passes through at least one of the waveband mirrors.

7. The barcode scanner of claim 6, wherein the waveband mirrors are oriented in line such that the other wavelength of light passes through all of the waveband mirrors.

8. The barcode scanner of claim 5, wherein the fields of view are oriented in different directions towards an item to be scanned.

9. The barcode scanner of claim 8, further comprising a plurality of folding mirrors for orienting the fields of view in the different directions.

10. The barcode scanner of claim 9, further comprising a horizontal portion having a substantially horizontal aperture and a tower portion having a substantially vertical aperture, wherein each of the substantially horizontal aperture and the substantially vertical aperture receive at least one of the different wavelengths of light.

11. The barcode scanner of claim 10, wherein one of the folding mirrors directs light reflected from a leading side of the item through the substantially horizontal aperture towards one of the waveband mirrors.

12. The barcode scanner of claim 10, wherein one of the folding mirrors directs light reflected from a trailing side of the item through the substantially horizontal aperture towards one of the waveband mirrors.

13. The barcode scanner of claim 10, wherein one of the folding mirrors directs light reflected from a bottom side of the item through the substantially horizontal aperture towards one of the waveband mirrors.

14. The barcode scanner of claim 10, wherein one of the folding mirrors directs light reflected from a checker side of the item through the substantially horizontal aperture towards one of the waveband mirrors.

15. The barcode scanner of claim 10, wherein one of the folding mirrors directs light reflected from a top side of the item through the substantially vertical aperture towards one of the waveband mirrors.

16. The barcode scanner of claim 10, wherein one of the folding mirrors directs light reflected from a tower-facing side of the item through the substantially vertical aperture towards one of the waveband mirrors.

17. A scanning method comprising:
sequentially activating a plurality of light devices each having a different wavelength of light and each associated with a different field of view to illuminate an item with a barcode, wherein sequentially activating further includes synchronizing activation of the light devices at a frame rate of an imager ensuring that the imager receives light from a single light device at a given instant in time;
reflecting at least one of the different wavelengths of light towards an imager by a waveband mirror;
producing an image from the at least one wavelength of light by the imager; and
decoding the barcode in the image.

18. The method of claim 17, further comprising:
reflecting another of the different wavelengths of light towards the imager by another waveband mirror; and
producing another image from the other wavelength of light by the imager.

* * * * *